Patented Sept. 8, 1936

2,053,770

UNITED STATES PATENT OFFICE

2,053,770

REMOVAL FROM A FERMENTING MEDIUM OF ORGANIC COMPOUNDS PRODUCED BY THE FERMENTATION

Henry Dreyfus, London, England

No Drawing. Application July 18, 1934, Serial No. 735,786. In Great Britain August 15, 1933

11 Claims. (Cl. 195—37)

This invention relates to the production of organic compounds by fermentation processes.

According to the present invention organic compounds produced by fermentation are removed as such from the liquor or mash containing the substrate, i. e. the substance being decomposed in the fermentation, during the process of the fermentation. By this means the ratio product: substrate may be maintained at a low level with the result that the yield of fermentation product per unit of time is considerably increased. In some cases the actual yield may be increased in this manner, for instance when the action of the enzyme or bacillus producing the fermentation is deleteriously affected by high concentration of the product, as in the acetic fermentation.

More specifically, the fermentation product may be removed in the liquid state and the invention particularly contemplates removal of the product by the action of a liquid in which the fermentation product is soluble but which has little or no solvent action upon the substrate.

In order to effect separation of the fermentation product from the aqueous fermenting liquor or mash and to avoid removal of substrate, or other substance present, in aqueous solution, the liquid employed for effecting the separation should be immiscible or substantially immiscible with water.

Recovery of the separated fermentation product from the liquid is most simply effected by distillation and hence a liquid boiling at a temperature substantially different from the boiling point of the fermentation product is most suitable from this point of view. It has been found most advantageous to employ a liquid which boils at a higher temperature than the fermentation product since, as the volume of the liquid used is usually larger than that of the fermentation product, heat is thus saved in the distillation. Moreover, in practice after the distillation the liquid is returned to the process to be used for extracting further quantities of fermentation product, and by avoiding distillation of the liquid itself any starting material or other substance removed from the fermentation liquor or mash together with the product is returned thereto when the liquid is again used for extraction; thus there may be employed a liquid in which the substrate is slightly soluble, since when such a liquid is saturated with the substrate it may be used repeatedly without effect on the substrate content of the fermentation liquor or mash.

The liquids employed are preferably aliphatic compounds, and iso-amyl alcohol and higher alcohols, amyl acetate, butyl acetate, ethyl butyrates or other esters, isopropyl ether or higher ethers, petroleum ethers and diethyl ketone or other water-insoluble ketones are bodies of wide application in this connection. Aromatic compounds, e. g. benzene, may, however, be employed if desired.

With the rapid fermentation which removal of the fermentation product permits, the substrate concentration is rapidly lowered, but this can be counteracted by replenishing the starting material used. A preferred form of the invention, therefore, comprises maintaining the substrate in high concentration by continuous or intermittent addition to the fermentation zone of fresh starting material, coupled with maintenance of low concentration of the fermentation product by continuous or intermittent removal thereof in solution; it will be appreciated that a continuous process is thus obtained. In such a continuous process continuous or intermittent additions may be made to keep a sufficiently high concentration of active fermenting complex. Such additions may be of the fermenting complex itself, whether of a particular yeast extract or bacterium or they may consist of additions of particular constituents. Thus, when fermenting with the aid of a top yeast, additions may be made of the particular enzyme taking part in the desired change, whilst if a bottom yeast is employed it is most advantageous in order to maintain an active fermentation to add coenzyme. Such additions can very conveniently be made together with the fresh supplies of starting material.

In carrying out the process of the invention it is particularly advantageous that additions made during the fermentation process, e. g. of water, fresh starting material or other substances, should be in such quantity as to maintain the various substances present (including the ferment) in substantially uniform concentration. In this connection it is to be noted that in, for example, the alcoholic fermentation of sugar an increase in volume of the fermentation liquor results in further growth of the yeast which involves consumption of sugar without formation of alcohol.

The output of fermentation processes per unit of time may be still further increased by other methods. Thus, in the alcoholic fermentation soluble phosphates may be added, preferably together with a small amount of a body, such as sodium arsenate, which prolongs the otherwise relatively short time of increased activity due to the additions of the phosphate.

Whilst the invention includes broadly the removal of the fermentation product as such, i. e. in the form in which it is produced, it should be remarked that it is not necessary where more than one product is produced by the fermentation that these products should be removed in the same proportion as those in which they are produced.

The process of the present invention is of especial importance in connection with anaerobic processes, e. g. the alcoholic and butyl-acetonic fermentations, since a layer of a suitable solvent can be maintained upon the surface of the fermenting material. By providing a run-off to maintain this surface layer at a suitable level and supplying fresh solvent, preferably at the bottom of the fermenting material so that it passes therethrough in its travel to the surface, a continuous removal of the fermentation product may be achieved.

Although only alcoholic and butyl-acetonic fermentation processes have been referred to specifically, it is to be understood that the invention is not limited in this respect, and may be applied to fermentation processes in general whatever the nature of the starting material employed, e. g. sugars, cellulose, starch as such or in the form of cereal grains, potatoes, molasses, beets, the products of cellulose hydrolysis and the like.

The following example illustrates the invention, as applied to the alcoholic fermentation of sugar, but it is to be understood that this example is given solely by way of illustration and is in no way limitative.

*Example*

An aqueous solution of fermentable sugar, such as may be obtained by the saccharification of cellulose, contained in a closed vessel is sterilized, after which a suitable yeast culture, together with suitable nutrients, is introduced and allowed to grow.

A layer of isoamyl alcohol is provided upon the surface of the sugar solution, the depth of this layer and of the sugar solution being ascertainable by means of sight glasses. Fresh isoamyl alcohol is fed into the lower region of the sugar solution at a number of points. A run-off for maintaining the isoamyl alcohol layer at a suitable level and an outlet for carbon dioxide, above the surface of the isoamyl alcohol, are also provided. The vessel is also fitted with a valved outlet enabling samples of the fermentation liquor to be taken from time to time.

After growth of the yeast is finished and alcohol production commences isoamyl alcohol is supplied continuously to the bottom of the fermentation vessel and withdrawn continuously from the top, that withdrawn at the top being fed to a still in which separated alcohol and water is distilled off whilst the isoamyl alcohol is returned for re-use as extraction medium.

The carbon dioxide escaping from the top of the vessel is cooled to condense any alcohol vapour not removed during its passage through the surface layer of isoamyl alcohol.

During the fermentation a sugar solution is introduced, of such a concentration that the sugar concentration in the fermentation liquor is maintained constant without any substantial change in the volume of the fermentation liquor. The solution thus introduced may also contain quantities of such other additions as it is desired to make in order to maintain an active fermentation.

What I claim and desire to secure by Letters Patent is:—

1. In a process for the manufacture of an organic compound by fermentation of a carbohydrate material, the step of removing said organic compound, as such and in liquid form, from the fermenting material during the fermentation thereof, by means of a liquid in which the organic compound is soluble, which liquid is inert towards the fermentation and has substantially no solvent action upon the substrate.

2. In a process for the manufacture of an organic compound by fermentation of a carbohydrate material, the step of removing said organic compound, as such and in liquid form, from the fermenting material during the fermentation thereof, by means of a liquid in which the organic compound is soluble, which liquid is inert towards the fermentation, has substantially no solvent action upon the substrate, and has a boiling point substantially above that of said organic compound.

3. In a process for the manufacture of an organic compound by fermentation of a carbohydrate material, the steps of removing said organic compound, as such and in liquid form, from the fermenting material during the fermentation thereof, by means of a liquid in which the organic compound is soluble, which liquid is inert towards the fermentation, has substantially no solvent action upon the substrate, and has a boiling point substantially above that of said organic compound, and maintaining the concentrations of the various substances in the fermentation zone substantially uniform throughout the process.

4. In a process for the manufacture of an organic compound by fermentation of a carbohydrate material, the steps of continuously removing said organic compound, as such and in liquid form, from the fermenting material during the fermentation thereof, by means of a liquid in which the organic compound is soluble, which liquid is inert towards the fermentation, has substantially no solvent action upon the substrate, and has a boiling point substantially above that of said organic compound, and continuously maintaining the concentrations of the various substances in the fermentation zone substantially uniform throughout the process.

5. In a process for the manufacture of ethyl alcohol by fermentation of a carbohydrate material, the step of removing ethyl alcohol, as such and in liquid form, from the fermenting material during the fermentation thereof, by means of a liquid in which ethyl alcohol is soluble, which liquid is inert towards the fermentation and has substantially no solvent action upon the substrate.

6. In a process for the manufacture of ethyl alcohol by fermentation of a carbohydrate material, the step of removing ethyl alcohol, as such and in liquid form, from the fermenting material during the fermentation thereof, by means of a liquid in which ethyl alcohol is soluble, which liquid is inert towards the fermentation, has substantially no solvent action upon the substrate, and has a boiling point substantially above that of ethyl alcohol.

7. In a process for the manufacture of ethyl alcohol by fermentation of a carbohydrate material, the steps of removing ethyl alcohol, as such and in liquid form, from the fermenting material during the fermentation thereof, by means of a liquid in which ethyl alcohol is soluble, which liquid is inert towards the fermentation and has substantially no solvent action upon the substrate, and maintaining the concentrations of the various substances in the fermentation zone substantially uniform throughout the process.

8. In a process for the manufacture of ethyl alcohol by fermentation of a carbohydrate material, the steps of continuously removing ethyl alcohol, as such and in liquid form, from the fermenting material during the fermentation thereof, by means of a liquid in which ethyl alcohol is soluble, which liquid is inert towards the fermentation, has substantially no solvent action upon the substrate, and has a boiling point substantially above that of ethyl alcohol, and continuously maintaining the concentrations of the various substances in the fermentation zone substantially uniform throughout the process.

9. In a process for the manufacture of ethyl alcohol by fermentation of a carbohydrate material, the step of removing ethyl alcohol, as such and in liquid form, from the fermenting material during the fermentation thereof, by means of isoamyl alcohol.

10. In a process for the manufacture of ethyl alcohol by fermentation of a carbohydrate material, the steps of removing ethyl alcohol, as such and in liquid form, from the fermenting material during the fermentation thereof, by means of isoamyl alcohol, and maintaining the concentrations of the various substances in the fermentation zone substantially uniform throughout the process.

11. In a process for the manufacture of ethyl alcohol by fermentation of a carbohydrate material, the steps of continuously removing ethyl alcohol, as such and in liquid form, from the fermenting material during the fermentation thereof, by means of isoamyl alcohol, and continuously maintaining the concentration of the various substances in the reaction zone substantially uniform throughout the process.

HENRY DREYFUS.